US009863315B2

(12) United States Patent
Takeda et al.

(10) Patent No.: US 9,863,315 B2
(45) Date of Patent: Jan. 9, 2018

(54) GAS TURBINE AND OPERATION METHOD OF GAS TURBINE

(71) Applicant: Mitsubishi Hitachi Power Systems, Ltd., Yokohama (JP)

(72) Inventors: Hiroki Takeda, Tokyo (JP); Ryo Akiyama, Tokyo (JP); Yasuo Takahashi, Tokyo (JP)

(73) Assignee: Mitsubishi Hitachi Power Systems, Ltd., Yokohama (JP)

( * ) Notice: Subject to any disclaimer, the term of this patent is extended or adjusted under 35 U.S.C. 154(b) by 701 days.

(21) Appl. No.: 14/070,805

(22) Filed: Nov. 4, 2013

(65) Prior Publication Data
US 2014/0325990 A1    Nov. 6, 2014

(30) Foreign Application Priority Data
Nov. 16, 2012  (JP) .................................. 2012-251767

(51) Int. Cl.
*F02C 3/30*    (2006.01)
*F02C 9/20*    (2006.01)
(Continued)

(52) U.S. Cl.
CPC ................ *F02C 3/30* (2013.01); *F01D 17/16* (2013.01); *F01K 21/047* (2013.01); *F02C 9/20* (2013.01);
(Continued)

(58) Field of Classification Search
CPC .......... F02C 7/057; F02C 7/1435; F02C 3/30; F02C 9/20; F02C 3/305; F01K 21/047; F05D 2270/16; F01D 17/16
See application file for complete search history.

(56) References Cited

U.S. PATENT DOCUMENTS 4,549,397 A * 10/1985 Cheng .................. F01K 21/047
60/39.3
4,928,478 A *  5/1990 Maslak ................. F01K 21/047
60/39.3
(Continued)

FOREIGN PATENT DOCUMENTS

JP      8-218891 A    8/1996
JP      9-125984 A    5/1997
(Continued)

OTHER PUBLICATIONS

Extended European Search Report dated Feb. 25, 2014 (seven (7) pages).
(Continued)

*Primary Examiner* — Andrew Nguyen
(74) *Attorney, Agent, or Firm* — Crowell & Moring LLP (57) ABSTRACT

A gas turbine having a compressor for compressing air, a combustor for taking in compressed air discharged from the compressor, mixing it with fuel, and burning them, and a turbine driven by combustion gas generated in the combustor, comprising: inlet guide vanes installed at a stage near an inlet of the compressor for adjusting a compressor flow rate by changing an attaching angle thereof, a steam injection mechanism for injecting steam to the combustor, a steam adjustment valve for adjusting the steam injection rate, and a steam rate control mechanism for adjusting an opening of the steam adjustment valve, a steam monitoring mechanism for monitoring the steam rate injected to the combustor, an air temperature monitoring mechanism for monitoring an atmospheric temperature, and a control unit for determining whether a restriction value of the steam injection rate using a temperature, an opening of the inlet guide vanes, and the steam injection rate as indexes is satisfied, and controlling at
(Continued)

least one of a temperature of air flowing into the compressor, the steam injection rate, and the inlet guide vane opening.

2 Claims, 6 Drawing Sheets

(51) Int. Cl.
*F01D 17/16* (2006.01)
*F01K 21/04* (2006.01)

(52) U.S. Cl.
CPC .............. *F05D 2260/2322* (2013.01); *F05D 2270/082* (2013.01); *F05D 2270/101* (2013.01); *F05D 2270/16* (2013.01); *Y02E 20/14* (2013.01); *Y02E 20/16* (2013.01)

(56) References Cited

U.S. PATENT DOCUMENTS

| 5,307,619 | A | * | 5/1994 | McCarty | ............... | F02C 9/28 60/39.3 |
| 5,357,741 | A | | 10/1994 | Talabisco et al. | | |
| 2006/0042258 | A1 | * | 3/2006 | Gadde | ............... | F01D 17/162 60/772 |
| 2007/0240400 | A1 | | 10/2007 | Smith et al. | | |
| 2010/0092896 | A1 | | 4/2010 | Barton et al. | | |
| 2010/0198419 | A1 | * | 8/2010 | Sonoda | ............... | F01D 17/16 700/290 |

FOREIGN PATENT DOCUMENTS

| JP | 2005-105848 A | 4/2005 |
| JP | 2007-285298 A | 11/2007 |
| JP | 2010-96177 A | 4/2010 |
| JP | 2011-32869 A | 2/2011 |

OTHER PUBLICATIONS

Japanese Office Action issued in counterpart Japanese Application No. 2012-251767 dated Jul. 12, 2016 with English-language translation (eight (8) pages).

* cited by examiner

GAS TURBINE AND OPERATION METHOD OF GAS TURBINE

The present application claims priority from Japanese patent application JP 2012-251767 filed on Nov. 16, 2012, the content of which is hereby incorporated by reference into this application.

BACKGROUND OF THE INVENTION

Field of the Invention

The present invention relates to a steam or inert gas injection gas turbine for injecting steam or inert gas to a combustor and a control method therefor and more particularly to an operation method of a gas turbine compressor.

Description of Related Art

In high-efficiency realization and high-output realization of a power generation gas turbine, the combustion temperature of the combustor needs realization of high temperature, however, in correspondence with a rise of the combustion temperature, the generation rate of NOx increases exponentially. NOx is generated in a portion locally raised in temperature by a diffusion flame, so that a method of injecting steam into the combustor, thereby lowering the combustion temperature of the high-temperature portion in the combustor, and reducing NOx is widely used. Further, steam is injected into the combustor, thus the combustion temperature in the combustor falls, so that it is possible to input more fuel and increase the gas turbine output.

As mentioned above, steam is injected into the gas turbine combustor, thus the effects of reduction in NOx of exhaust gas of the gas turbine and improvement of the gas turbine output are obtained, however, high-pressure steam is injected into the combustor, thus the pressure ratio of the gas turbine compressor increases and the axial flow speed decreases. Therefore, the reduction in the compressor reliability becomes a problem such that the pressure ratio per each vane stage of the compressor increases and the vane load of the compressor increases, thus there is a risk that an unstable phenomenon such as surging may be caused.

Further, in the gas turbine with steam or inert gas injected, the pressure ratio is changed due to the change in the ambient environment temperature. For example, at the time of a low temperature, the atmospheric density is higher than that at the time of a high temperature, so that the mass flow rate in the compressor increases and the pressure ratio increases compared with at the time of a high temperature. Therefore, similarly, the reduction in the compressor reliability comes into a problem.

In the axial flow compressor of the gas turbine, generally, as an air flow rate adjustment mechanism of the compressor, an inlet guide vane is attached. The inlet guide vane is a vane(s) capable of actively controlling the vane attaching angle in a stator vane at one stage or stator vanes at a plurality of stages close to the inlet of the compressor, and the angle of the inlet guide vane(s) is adjusted, thus the flow rate and pressure ratio in the compressor can be adjusted. By the adjustment of the inlet guide vane(s), when the flow rate of the compressor is reduced, the pressure ratio is reduced, then the axial flow speed in the compressor is reduced. Therefore, depending on the stage of the compressor, the vane load increases and a risk of generation of an unstable phenomenon such as surging may be increased.

As mentioned above, in the gas turbine with the combustor injected with steam, under the conditions of the atmospheric temperature, if the inlet guide vane opening and the steam injection rate are not appropriate, there is a risk of an extreme reduction in the compressor reliability. As a method for controlling the guide vane opening for the steam injection rate, in the patent literature 1, a method for opening and closing the guide vane opening in accordance with an increase and a decrease in the steam injection rate so as to keep the pressure ratio constant is described. Further, in the patent literature 2, to ensure the compressor vane reliability in correspondence with the atmospheric temperature and atmospheric humidity, a method for restricting the guide vane opening is described.

CITATION LIST

Patent Literature

{Patent Literature 1}
Japanese Patent Laid-Open No. Hei 9(1997)-125984
{Patent Literature 2}
Japanese Patent Laid-open No. 2011-32869

SUMMARY OF INVENTION

Technical Problem

In the method described in the patent literature 1, in accordance with an increase in the steam injection rate, the inlet guide vane opening is closed to reduce the compressor flow rate, thus the compressor vane load increases more, so that the risk of generation of an unstable phenomenon such as surging is not avoided.

Further, the method described in the patent literature 2 is a method for avoiding the influence on the compressor vanes by condensation or icing of moisture in the atmosphere and the influence on the compressor vane load by steam injection to the combustor is not considered.

Therefore, an object of the present invention is to provide a gas turbine and an operation method of gas turbine capable of suppressing the reduction in compressor reliability caused by the change in the steam injection rate, temperature (compressor intake air temperature), or inlet guide vane opening.

Solution to Problem

The present invention of a gas turbine having a compressor for compressing air, a combustor for taking in compressed air discharged from the compressor, mixing it with fuel, and burning them, and a turbine driven by combustion gas generated in the combustor, comprising: inlet guide vanes installed at a stage near an inlet of the compressor for adjusting a compressor flow rate by changing an attaching angle thereof, a steam injection mechanism for injecting steam to the combustor, a steam adjustment valve for adjusting the steam injection rate, and a steam rate control mechanism for adjusting an opening of the steam adjustment valve, a steam monitoring mechanism for monitoring the steam rate injected to the combustor, an air temperature monitoring mechanism for monitoring an atmospheric temperature, and a control unit for determining whether a restriction value of the steam injection rate using a temperature, an opening of the inlet guide vanes, and the steam injection rate as indexes is satisfied, and controlling at least one of a temperature of air flowing into the compressor, the steam injection rate, and the inlet guide vane opening.

The present invention of a gas turbine having a compressor for compressing air, a combustor for taking in compressed air discharged from the compressor, mixing it with fuel, and burning them, and a turbine driven by combustion gas generated in the combustor, comprising: inlet guide vanes installed at a stage near an inlet of the compressor for adjusting a compressor flow rate by changing an attaching angle thereof, a steam injection mechanism for injecting steam to the combustor, a steam adjustment valve for adjusting the steam injection rate, and a steam rate control mechanism for adjusting an opening of the steam adjustment valve, a steam monitoring mechanism for monitoring the steam rate injected to the combustor, a pressure ratio monitoring mechanism for measuring a pressure of the compressed air discharged from the compressor, an air temperature monitoring mechanism for monitoring an atmospheric temperature, and a control unit for determining whether a restriction value of the pressure ratio using an opening of the inlet guide vanes and the temperature as indexes, which is set to prevent a vane load of the compressor from becoming excessive, is satisfied, and controlling at least one of a temperature of air flowing into the compressor, the steam injection rate, and the inlet guide vane opening.

The present invention of an operation method of a gas turbine having a compressor for compressing air, a combustor for taking in compressed air discharged from the compressor, mixing it with fuel, and burning them, and a turbine driven by combustion gas generated in the combustor, inlet guide vanes installed at a stage near an inlet of the compressor for adjusting a compressor flow rate by changing an attaching angle thereof, and a steam injection mechanism for injecting steam to the combustor, comprising the steps of: determining whether a restriction value of a steam injection rate using a temperature, an opening of the inlet guide vanes, and the steam injection rate as indexes is satisfied, and controlling at least one of a temperature of air flowing into the compressor, the steam injection rate, and the inlet guide vane opening.

The present invention of an operation method of a gas turbine having a compressor for compressing air, a combustor for taking in compressed air discharged from the compressor, mixing it with fuel, and burning them, and a turbine driven by combustion gas generated in the combustor, inlet guide vanes installed at a stage near an inlet of the compressor for adjusting a compressor flow rate by changing an attaching angle thereof, and a steam injection mechanism for injecting steam to the combustor, comprising the steps of: determining whether a restriction value of a pressure ratio using an opening of the inlet guide vanes and a temperature as indexes, which is set to prevent a vane load of the compressor from becoming excessive, is satisfied, and controlling at least one of a temperature of air flowing into the compressor, a steam injection rate, and the inlet guide vane opening.

Advantageous Effects of Invention

According to the present invention, a gas turbine and an operation method of gas turbine capable of suppressing the reduction in compressor reliability caused by the change in the steam injection rate, temperature (compressor intake air temperature), or inlet guide vane opening can be realized.

DETAILED DESCRIPTION OF THE INVENTION

In the gas turbine with the combustor injected with steam, due to an increase in the steam injection rate, the pressure ratio of the compressor increases, so that the load per each vane stage of the compressor increases. By doing this, a risk of generation of an unstable phenomenon such as surging increases and the reduction in the compressor reliability comes into a problem. Further, the vane load varies with the temperature and at the time of a low temperature, the pressure ratio of the compressor increases, so that the load per each compressor vane stage increases. Therefore, a risk of generation of an unstable phenomenon such as surging increases and the reduction in the compressor reliability comes into a problem. Further, the inlet guide vane opening of the compressor changes, thus the axial flow speed in the compressor changes and the vane load changes. Therefore, due to the change in the inlet guide vane opening, a risk of generation of an unstable phenomenon such as surging increases, and the reduction in the compressor reliability becomes a problem.

In the embodiments of the present invention which will be explained hereunder, the gas turbine with the combustor injected with steam includes an atmospheric temperature monitoring mechanism, a steam injection rate monitoring mechanism, inlet guide vanes for adjusting the stator vane attaching angle at the front stage of the compressor and adjusting the flow-in air rate of the compressor, and a mechanism for controlling the steam injection rate and is characterized in that a restriction value for preventing the vane load or surge margin in each atmospheric temperature condition, the steam injection rate, and the inlet guide vane opening from exceeding a fixed quantity is preset, thus the inlet guide vane opening or the steam injection rate is restricted or controlled. Further, the gas turbine includes a mechanism for monitoring the pressure ratio in place of the steam injection rate and presets beforehand a restriction value for preventing the vane load or surge margin in each atmospheric temperature condition, the pressure ratio, and the inlet guide vane opening from exceeding a fixed quantity, thereby allowing the inlet guide vane opening or the steam injection rate to be restricted or controlled.

And, in the gas turbine with the combustor injected with steam, the restriction value for preventing the vane load of the compressor or surge margin in each atmospheric temperature condition, the steam injection rate, and the inlet guide vane opening from exceeding a fixed quantity is preset, thus the inlet guide vane opening or the steam injection rate is restricted or controlled, so that the operation conditions capable of ensuring the safety of the compressor of the gas turbine are made clear and the reliability of the compressor is improved.

Further, at each atmospheric temperature, in the steam injection rate and the inlet guide vane opening, the restriction value for preventing the vane load of the compressor or surge margin from exceeding the fixed quantity is made clear beforehand, thus automatic control for the steam injection rate and the inlet guide vane opening for ensuring the safety of the compressor is enabled. Further, the restriction value is a restriction value in consideration of the atmospheric temperature, so that from the cold district to the warm district, the steam injection rate and the inlet guide vane opening can be controlled by a common index, and the examination of the operation conditions in each operation district becomes unnecessary, and the development efficiency is improved.

Embodiment 1

Figure 1:
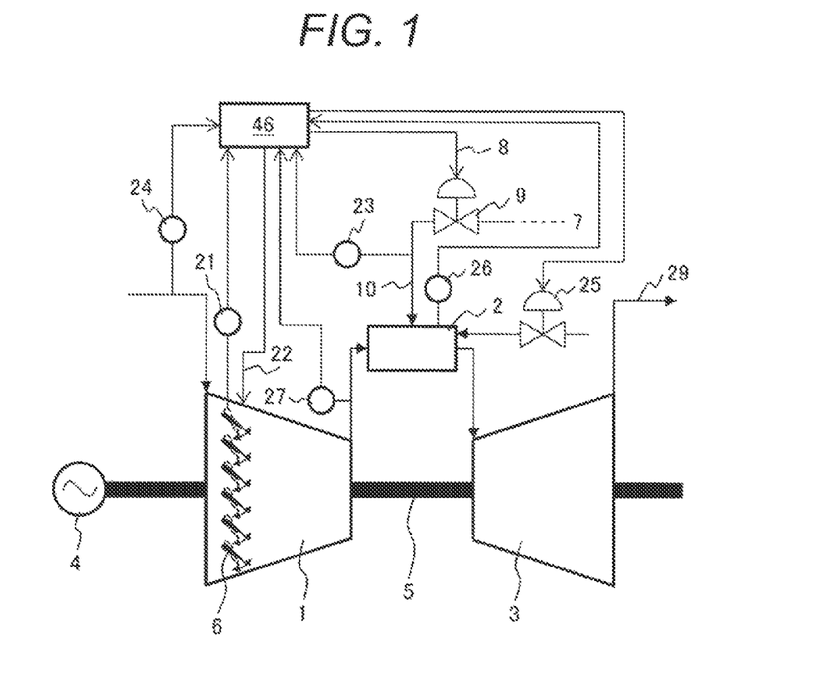
FIG. 1 is a schematic view of the gas turbine with the combustor injected with steam in a first, a second, and a third embodiment of the present invention.

A preferable embodiment of the present invention will be explained below by referring to the drawings. FIG. 1 is a schematic block diagram showing the gas turbine facilities structured using the steam injection gas turbine relating to a first embodiment of the present invention. The gas turbine of the first embodiment includes a rotor 5, a compressor 1 for compressing air, inlet guide vanes 6 installed at the stages near the compressor inlet, an inlet guide vane opening monitoring mechanism 21 for monitoring the opening of the inlet guide vanes 6, an inlet guide vane adjustment mechanism 22 for adjusting the opening of the inlet guide vanes 6, a combustor 2 for taking in compressed air, mixing it with fuel, and burning them, a turbine 3 for converting the combustion energy to the drive force of the rotor 5, a generator 4 for converting the rotation drive force of the rotor 5 to electricity, a steam feed system 7 for feeding steam to the combustor 2, an pressure regulation valve 9 for adjusting the steam injection rate, a steam rate adjustment mechanism 8 for adjusting the pressure regulation valve 9, a steam monitoring mechanism 23 for monitoring the steam rate injected to the combustor 2, and an air temperature monitoring mechanism 24 for monitoring the atmospheric temperature.

In the gas turbine of this embodiment, air in the atmosphere is taken in by the compressor 1 and is compressed, and the compressed air is mixed with fuel in the combustor 2 and is burned, thus high-temperature and high-pressure gas is generated. The movable vanes of the turbine 3 receive the high-temperature and high-pressure gas and convert it to the rotation power of the rotor 5, and the rotation power is converted to electric energy from the generator 4. Further, in the stator vane(s) at one stage or a plurality of stages of the front stages of the compressor 1, a mechanism for adjusting the attaching angle is installed. The stator vanes with such a mechanism installed are called inlet guide vanes 6. The attaching angle of the inlet guide vanes 6 is adjusted, thus the flow-in air rate to the compressor 1 is adjusted so that the gas turbine operates preferably. In the gas turbine with the combustor 2 injected with steam, high-pressure steam is fed from the steam feed system 7, and the high-pressure steam is reduced to a steam pressure higher than the pressure of a plenum chamber 11 of the combustor 2 by the pressure regulation valve 9 and then is injected into the combustor 2 via a steam introduction path 10.

Figure 2:
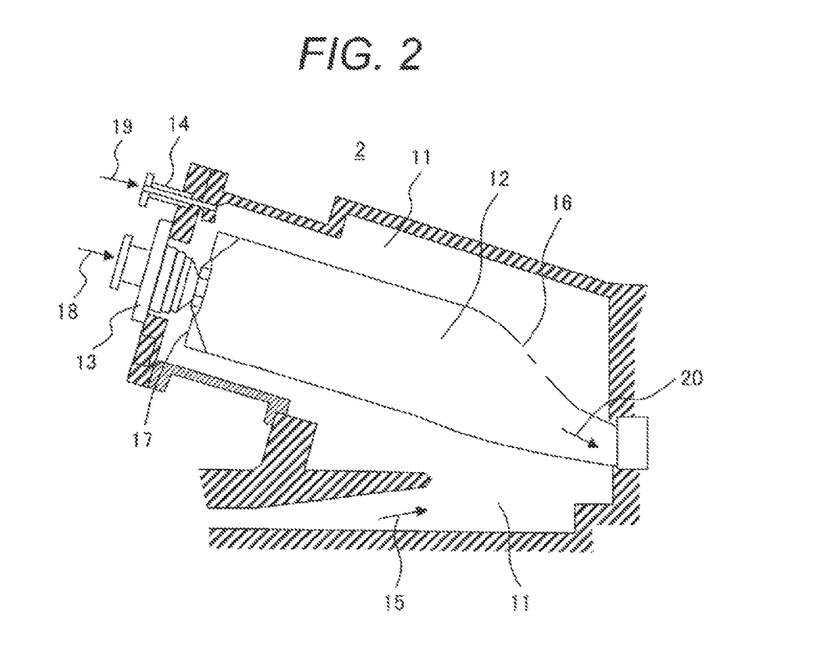
FIG. 2 is a schematic view of the steam injection combustor in the first embodiment shown in the FIG. 1.

The constitution of the combustor 2 of the gas turbine with the combustor 2 injected with steam in the present embodiment will be explained by referring to FIG. 2. The combustor 2 of the steam injection gas turbine is composed of the plenum chamber 11, the combustor 12, a fuel nozzle 13, and a steam nozzle 14. Compressor air 15 compressed by the compressor 1 flows into the circular plenum chamber 11, and a part thereof flows into a combustion chamber 12 from a dilution hole 16 installed on the downstream side of the peripheral wall of the combustion chamber 12, and the remainder, in the plenum chamber 11, is mixed with steam 19 injected from the steam nozzle 14 attached in a close position of the fuel nozzle 13 and lowers in temperature.

The compressed air mixed with steam in the plenum chamber 11 is changed into a rotation flow by a swirler 17 and then flows into the combustion chamber 12. The compressed air mixed with the steam flowing into the combustion chamber 12 from the swirler 17 is mixed with fuel 18 injected from the fuel nozzle 13 and is burned, and combustion gas is fed to the turbine 3 together with the steam. As mentioned above, the combustor 2 injected with steam, due to mixture of the compressed air 15 with the steam 19, lowers in temperature, so that the combustion temperature falls, and NOx is reduced. Further, due to the reduction in the combustion temperature, the fuel 18 in larger quantities can be input, so that the output of the gas turbine can be increased.

In the combustor 2 injected with steam, the compressed fluid composed of the steam 19 and the compressed air from the compressor 1 increases in quantity. As a result, after the compressed fluid is burned in the combustor 2, combustion gas 20 does not flow out smoothly toward the turbine, so that the pressure in the plenum chamber 11 which is a back-pressure of the compressor 1 increases, that is, the pressure ratio of the compressor 1 increases. Therefore, the pressure ratio per each vane stage of the compressor 1 increases and the vane load increases.

On the other hand, if the inlet guide vanes 6 are closed, the vane load may increase depending on the stage of the compressor 1. Further, depending on the change in the ambient environment temperature, the pressure ratio increases. For example, at the time of a low temperature, the atmospheric density is higher than that at the time of a high temperature, so that the mass flow rate in the compressor 1 increases and compared with at the time of a high temperature, the pressure ratio increases. Thus, from the viewpoint of the safety of the compressor, when the inlet guide vanes 6 are closed, the compressor 1 is set under severe conditions as the steam injection rate to the combustor 2 increases and the atmospheric temperature falls.

The gas turbine operation control system performed by the control unit 46 of this embodiment is shown in FIGS. 1, 3, 4 and 5. By the air temperature monitoring mechanism 24, the atmospheric temperature is detected and, using the atmospheric temperature, the output target value, and the steam injection rate to be input as input values, an appropriate opening of the inlet guide vanes 6 is calculated. Here, in the gas turbine operation system of this embodiment, by comparing the calculated opening of the inlet guide vanes 6 with a preset operation restriction value map which will be described later, whether the calculated opening of the inlet guide vanes 6 satisfies the restriction value or not is determined.

Figure 3:
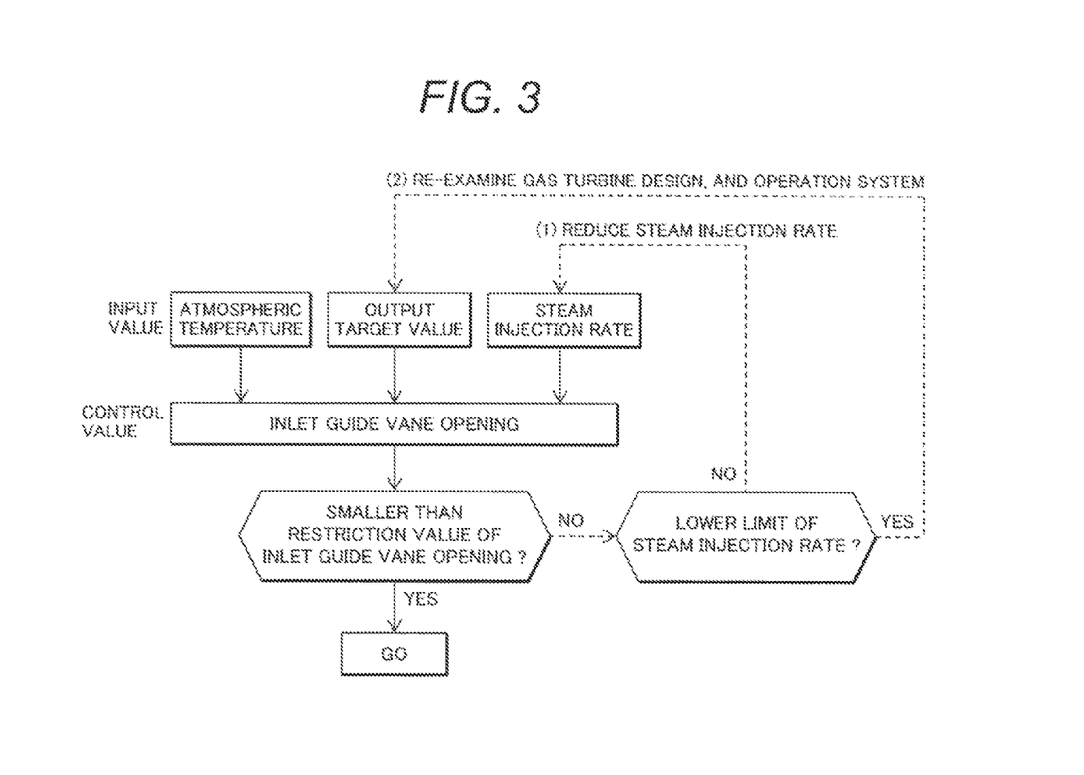
FIG. 3 is a schematic view of a first control method for the gas turbine injected with steam in the first embodiment.

When the calculated opening of the inlet guide vanes 6 is determined to be inoperable, the steam injection rate or the output target value must be corrected, though generally, the steam injection rate is reduced firstly. If the operation condition is not reduced lower than the restricted value even after the steam injection rate is reduced to the limit, there is a possibility that the output target value is inappropriate. Therefore, the gas turbine must be designed and the operation system be constructed so that no operation will be performed within such a range. The minimum value of the steam injection rate is, for example, a steam injection rate necessary at its minimum to reduce NOx.

Figure 4:
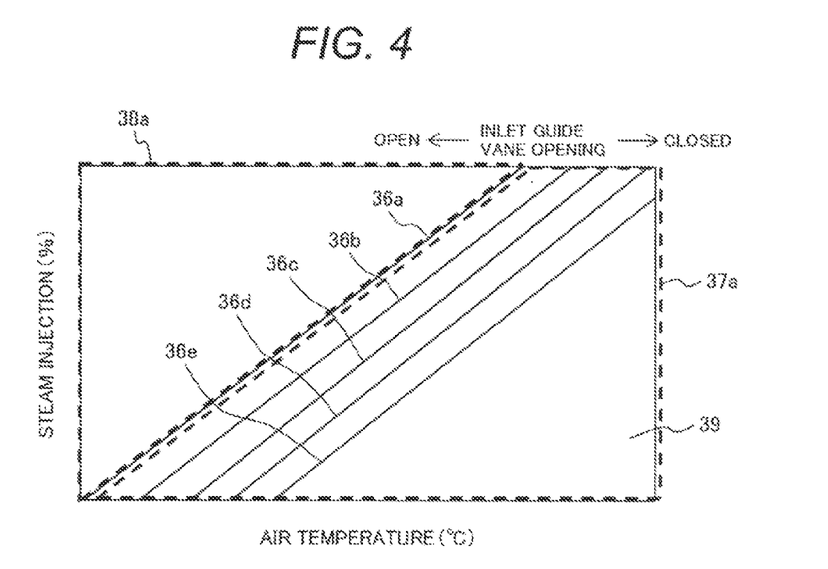
FIG. 4 is a schematic view of the steam injection rate restriction value map in the first and second control methods in the first embodiment.

The presetting restriction values of the steam injection rate and the opening of the inlet guide vanes 6 are, for example, as shown in FIG. 4. FIG. 4 shows a restriction value map 39 with the air temperature indicated on the horizontal axis and the steam injection rate indicated on the vertical axis and lines 36a, 36b, 36c, 36d, and 36e shown in FIG. 4 indicate the restriction values of the steam injection rate in inlet guide vane openings a, b, c, d, and e. For example, when the inlet guide vane opening is a, the lower right region of the line 36a is an operable range 37a and the upper left region of the line 36a is an inoperable range 38a. Even when the inlet guide vane opening is b, c, d, or e, similarly, the lower right range of the line 36b, 36c, 36d, or 36e is an operable range 37b, 37c, 37d, or 37e (not shown) and the upper left range is an inoperable range 38b, 38c, 38d, or 38e (not shown).

In the compressor 1 in which as the opening of the inlet guide vanes 6 is opened, the maximum values of the vane load at all the stages of the compressor 1 reduce, as in the restriction value map 39 shown in FIG. 4, as the opening of the inlet guide vanes 6 is opened, the restriction value of the steam injection rate increases. However, in FIG. 4, the restriction value map 39 of the compressor 1 in which as the opening of the inlet guide vanes 6 is opened, the maximum values of the vane load at all the stages reduce is shown as an example, though the case that this tendency is reversed may be considered.

Figure 5:
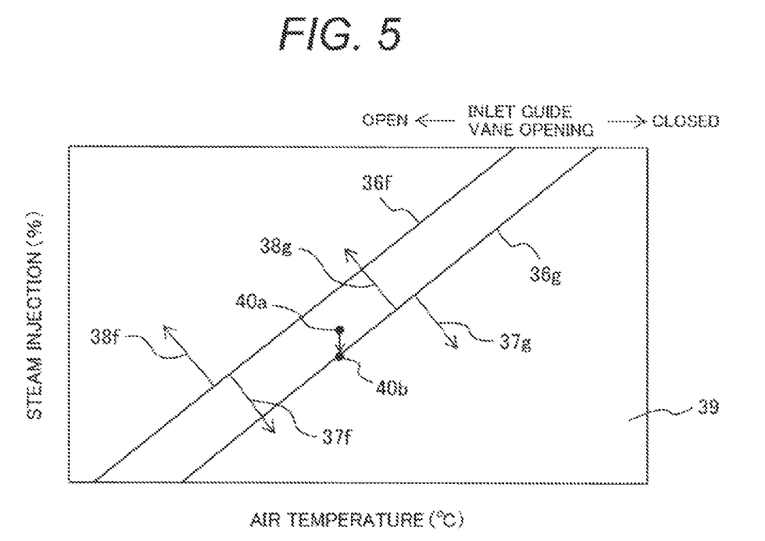
FIG. 5 is a schematic view showing an operation example where the first control method in the first embodiment is applied.

An operation method of the gas turbine in this embodiment will be explained by referring to FIG. 5. In the gas turbine of this embodiment, due to the temperature measured by the air temperature monitoring mechanism 24 and the steam injection rate to be input, the operation conditions are plotted on the restriction value map 39. Here, the case that the temperature and the input steam injection rate are operation conditions 40a will be explained as an example. Next, the opening of the inlet guide vanes 6 is calculated from the temperature, the steam injection rate, and the output target value. By the opening of the inlet guide vanes 6, the restriction value is determined, and for example, assuming the inlet guide vane opening as f and the restriction value at this time as a line 36f, it is found that the operable range is an operable range 37f and the inoperable range is an inoperable range 38f. In this example, the operation conditions 40a are within the operable range 37f, so that it is judged that the gas turbine is operable.

However, when the opening of the inlet guide vanes 6 is smaller than f, the restriction value of the steam injection rate moves to the lower right region of the restriction value line 36f and for example, becomes a restriction value line 37g, so that the operable range becomes the operable range 37g and the inoperable range becomes an inoperable range 38g. In this example, the operation conditions 40a are within the inoperable range 38g, so that it is impossible to achieve the target output only by the opening of the inlet guide vanes 6 and the steam injection rate must be reduced to, for example, 40b.

The operation method of the first embodiment is a method for determining a steam injection rate to be input first, so that it is valid, for example, in the case that the steam injection rate is already determined for NOx reduction or in the operation system where in another system, steam was generated and the steam rate to be fed has been determined regardless of the gas turbine operation. Namely, using the air temperature, steam injection rate, and target output as input values, the inlet guide vane opening is controlled so as to control the operation condition to smaller than the restriction value, thus even when the control for the steam injection rate is difficult, the reduction of the reliability of the compressor can be suppressed.

In the operation control method in this embodiment, in the gas turbine with the combustor 2 injected with steam, the restriction value for preventing the vane load of the compressor 1 in each atmospheric temperature condition, the steam injection rate, and the opening of the inlet guide vanes 6 from exceeding a fixed quantity is preset, thus the opening of the inlet guide vanes 6 or the steam injection rate is restricted, so that the operation conditions capable of ensuring the safety of the compressor 1 of the gas turbine are made clear and the reliability of the compressor 1 is improved.

Further, at each atmospheric temperature, in the steam injection rate and the opening of the inlet guide vanes 6, the restriction value for preventing the vane load of the compressor 1 from exceeding the fixed quantity is made clear beforehand, thus automatic control for the steam injection rate and the opening of the inlet guide vanes 6 for ensuring the safety of the compressor is enabled. Further, the restriction value is a restriction value in consideration of the atmospheric temperature, so that from the cold district to the warm district, the steam injection rate and the inlet guide vane opening can be controlled by a common index, and the examination of the operation conditions in each operation district becomes unnecessary, and the development efficiency is improved.

Further, in this embodiment, the operation method using the restriction value map 39 in which as a preset operation restriction value map, the air temperature is indicated on the horizontal axis and the steam injection rate is indicated on the vertical axis, and for each inlet guide vane opening, the steam injection rate restriction value lines 36 are drawn is shown, though an operation method for setting the restriction value of the pressure ratio instead of the steam injection rate and monitoring the pressure ratio so as to be controlled to lower than the restriction value may be used. In this case, the pressure ratio directly relating to the vane load can be monitored, so that the reliability of the compressor is improved.

Embodiment 2

A second embodiment of the present invention will be explained below by referring to FIGS. 1 and 6. The gas turbine of the second embodiment, as shown in FIG. 1, includes the rotor 5, the compressor 1 for compressing air, the inlet guide vanes 6 installed at the stages near the compressor inlet, the inlet guide vane opening monitoring mechanism 21 for monitoring the inlet guide vane opening, the inlet guide vane adjustment mechanism 22 for adjusting the inlet guide vane opening, the combustor 2 for taking in compressed air, mixing it with the fuel 18, and burning them, the turbine 3 for converting the combustion energy to the drive force of the rotor 5, the generator 4 for converting the rotation drive force of the rotor 5 to electricity, the steam feed system 7 for feeding steam to the combustor 2, the pressure regulation valve 9 for adjusting the steam injection rate, the steam rate adjustment mechanism 8 for adjusting the opening of the pressure regulation valve 9, the steam monitoring mechanism 23 for monitoring the steam rate injected to the combustor 2, and the air temperature monitoring mechanism 24 for monitoring the atmospheric temperature.

Figure 6:
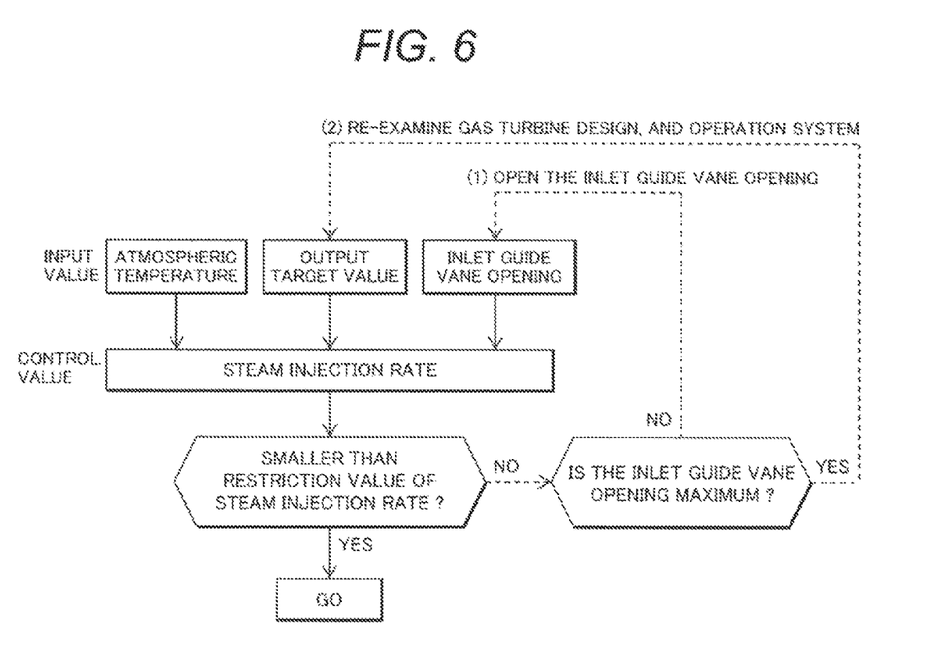
FIG. 6 is a schematic view of the second control method for the gas turbine injected with steam in the second embodiment of the present invention.

The gas turbine operation control system performed by the control unit 46 of this embodiment is shown in FIGS. 1 and 6. By the air temperature monitoring mechanism 24, the atmospheric temperature is detected and using the atmospheric temperature, the output target value, and the opening of the inlet guide vanes 6 as input values, an appropriate steam injection rate is calculated. In the gas turbine operation system of the second embodiment, compared with the preset operation restriction value map 39, whether the calculated opening of the inlet guide vanes 6 satisfies the restriction value or not is determined. When it is determined to be inoperable by the calculated steam injection rate, the opening of the inlet guide vanes 6 or the output target value must be corrected, though generally, the opening of the inlet guide vanes 6 is changed firstly.

In the case of the compressor 1 in which as the opening of the inlet guide vanes 6 is opened, the restriction value of the steam injection rate increases, the inlet guide vanes 6 are opened, thus the vane reliability is improved and the output is improved. If the operation condition is not reduced lower than the restricted value even after the inlet guide vanes 6 are opened at the maximum, there is a possibility that the output target value is inappropriate. Therefore, a gas turbine must be designed and an operation system be constructed so that no operation will be performed within such a range.

Figure 7:
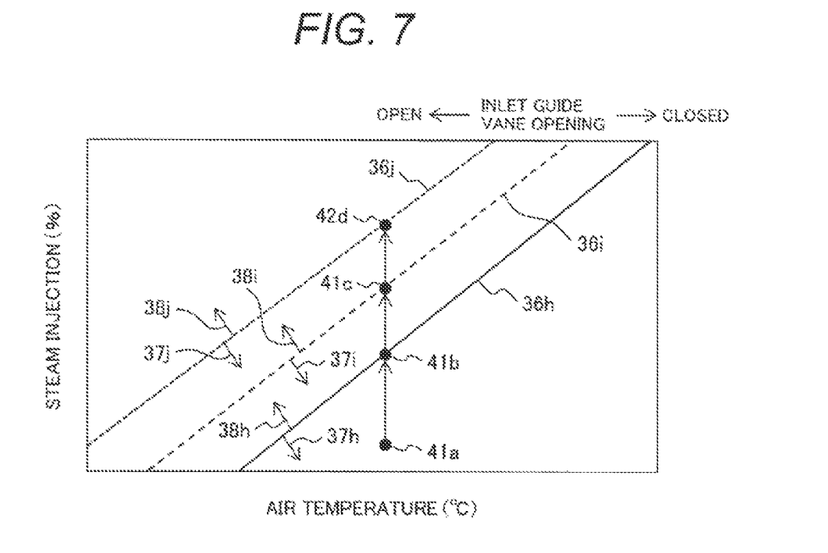
FIG. 7 is a schematic view showing an operation example where the second control method in the second embodiment is applied.

An operation method of the gas turbine in the second embodiment will be explained by referring to FIG. 7. In the gas turbine of the second embodiment, the environment temperature measured by the air temperature monitoring mechanism 24 and the opening of the inlet guide vanes 6 which was determined initially are compared with the restriction value map 39, thus a restriction value of a steam injection rate which can be input is calculated. For example, when the opening of the inlet guide vanes 6 is h, assuming the restriction value of the steam injection rate as a restriction value line 36$h$, the lower right range of the restriction value line 36$h$ becomes an operable range 37$h$ and the upper left range becomes an inoperable range 38$j$.

Next, the steam injection rate is calculated from the air temperature, the opening of the inlet guide vanes 6, and the output target value, and the operation conditions determined from the relation between the steam injection rate and the air temperature are plotted on the restriction value map 39. Here, assuming the operation conditions are, for example, operation conditions 41$a$, the operation conditions 41$a$ are within the operable range 37$h$, so that the gas turbine is judged as operable. When increasing the output with the opening h of the inlet guide vanes 6 kept and adjusting the increased output by the steam injection rate, the upper value of the steam injection rate which can be input for the output increase is the steam injection rate under operation conditions 41$b$ when the operation conditions are on the restriction line 36$h$. When intending to increase the output more than the state of the operation conditions b and the opening h of the inlet guide vanes 6, it is impossible to achieve the output target value only by the steam injection rate, so that the opening of the inlet guide vanes 6 is increased, for example, up to i and the restriction value of the steam injection rate is increased up to a restriction value line 36$i$. At this time, the opening of the inlet guide vanes 6 is opened, thus the output is improved and furthermore, the steam injection rate can be increased up to 41$c$, so that the output can be increased more.

In the gas turbine of this embodiment, when the maximum value of the opening of the inlet guide vanes 6 is j and the restriction value line at this time is 36$j$ and when the steam injection rate is set under operation conditions 42$d$, the maximum output can be taken out at the given air temperature in the system, so that at the stage of gas turbine design and operation system construction, it is desirable to examine beforehand so as not to take out output larger than the conditions.

In the second embodiment, the compressor 1 in which as the opening of the inlet guide vanes 6 is opened, the vane load reduces is explained as an example, though even a compressor in which as the opening of the inlet guide vanes 6 is closed, the vane load reduces can be controlled by the similar method. However, in this case, as the opening of the inlet guide vanes 6 is closed, the steam injection rate can be input in larger quantities, though which way can improve the output more, closing the opening of the inlet guide vanes 6 and increasing the steam injection rate or reducing the steam injection rate and opening the opening of the inlet guide vanes 6, needs another examination.

The operation method of the second embodiment is a control method of initially determining the opening of the inlet guide vanes 6, so that it is valid in the operation system where the opening of the inlet guide vanes 6 is opened at its maximum to operate the gas turbine and when the output becomes insufficient, the output is additionally adjusted by the steam injection rate. Namely, the air temperature, the inlet guide vane opening, and the target output are used as input values and the steam injection rate is controlled so as to make the operation conditions lower than the restriction value, thus particularly in an operation system for adjusting the output by the steam injection rate, the reduction in compressor reliability can be suppressed.

In the operation control method in the second embodiment, in the gas turbine with the combustor injected with steam, the restriction value for preventing the vane load of the compressor 1 in each atmospheric temperature condition, the steam injection rate, and the opening of the inlet guide vanes 6 from exceeding a fixed quantity is preset, thus the opening of the inlet guide vanes 6 or the steam injection rate is restricted, so that the operation conditions capable of ensuring the safety of the compressor 1 of the gas turbine are made clear and the reliability of the compressor 1 is improved.

Further, at each atmospheric temperature, in the steam injection rate and the opening of the inlet guide vanes 6, the restriction value for preventing the vane load of the compressor 1 from exceeding the fixed quantity is made clear beforehand, thus automatic control for the steam injection rate and the opening of the inlet guide vanes 6 for ensuring the safety of the compressor is enabled. Further, the restriction value is a restriction value in consideration of the atmospheric temperature, so that from the cold district to the warm district, the steam injection rate and the inlet guide vane opening can be controlled by a common index, and the examination of the operation conditions in each operation district becomes unnecessary, and the development efficiency is improved.

Further, in this embodiment, the operation method using the restriction value map 39 in which as a preset operation restriction value map, the air temperature is indicated on the horizontal axis and the steam injection rate is indicated on the vertical axis, and for each inlet guide vane opening, the steam injection rate restriction value lines 36 are drawn is shown, though an operation method for setting the restriction value of the pressure ratio instead of the steam injection rate and monitoring the pressure ratio so as to be controlled to lower than the restriction value may be used. In this case, the pressure ratio directly relating to the vane load can be monitored, so that the reliability of the compressor is improved.

Embodiment 3

A third embodiment of the present invention will be explained below by referring to FIGS. 1, 8 and 9. The gas turbine of the third embodiment includes the rotor 5, the compressor 1 for compressing air, the inlet guide vanes 6 installed at the stages near the inlet of the compressor 1, the inlet guide vane opening monitoring mechanism 21 for monitoring the opening of the inlet guide vanes 6, the inlet guide vane adjustment mechanism 22 for adjusting the inlet guide vane opening, the combustor 2 for taking in compressed air, mixing it with the fuel 18, and burning them, a fuel adjustment mechanism 25 for adjusting fuel, a combustion temperature monitoring mechanism 26 for monitoring the combustion temperature, a pressure ratio monitoring mechanism 27 for measuring a pressure of the compressed air discharged from the compressor 1, the turbine 3 for converting the combustion energy to the drive force of the rotor 5, the generator 4 for converting the rotation drive force of the rotor 5 to electricity, the steam feed system 7 for feeding steam to the combustor 2, the pressure regulation valve 9 for adjusting the steam injection rate, the steam rate adjustment mechanism 8 for adjusting the opening of the steam pressure regulation valve 9, the steam monitoring mechanism 23 for monitoring the steam rate injected to the combustor 2, and the air temperature monitoring mechanism 24 for monitoring the atmospheric temperature.

Figure 8:
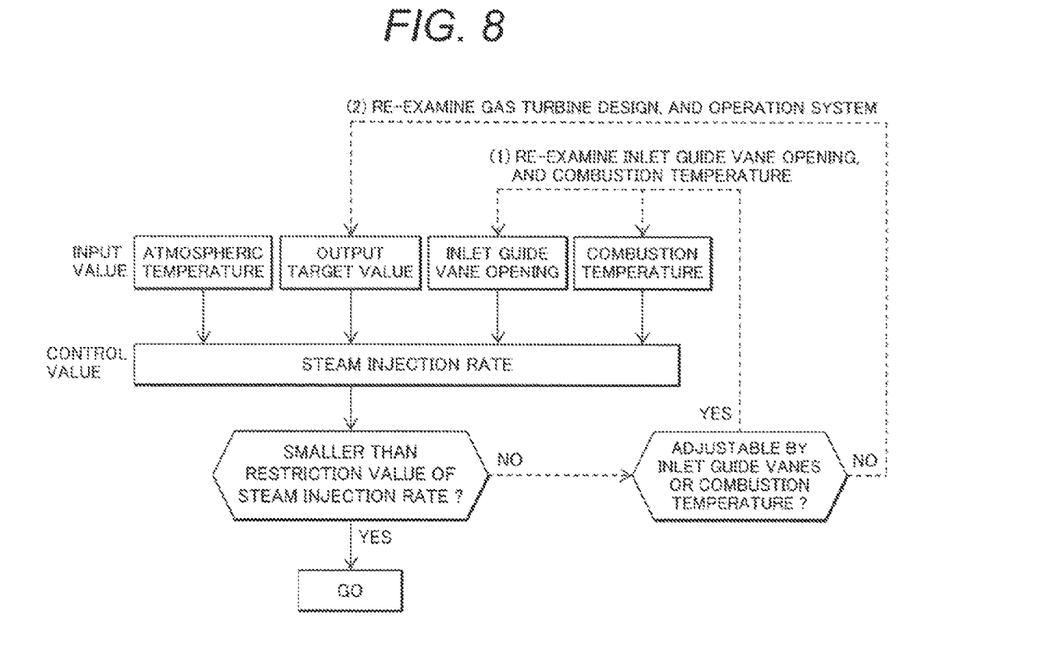
FIG. 8 is a schematic view of the third control method for the gas turbine injected with steam in a third embodiment of the present invention.
Figure 9:
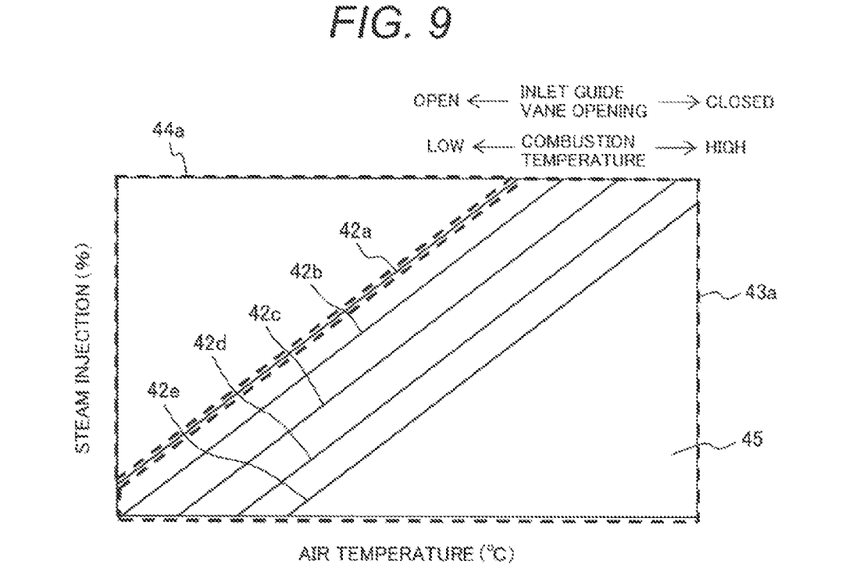
FIG. 9 is a schematic view of the steam injection rate restriction value map in the third control method in the third embodiment.

The gas turbine operation control system of the third embodiment is shown in FIGS. 1 8 and 9. By the air temperature monitoring mechanism 24, the atmospheric temperature is detected and using the atmospheric temperature, the output target value, the combustion temperature, and the opening of the inlet guide vanes 6 as input values, an appropriate steam injection rate is calculated. Here, in the gas turbine operation system of the third embodiment, by comparing the calculated steam injection rate with the preset operation restriction value map which will be described later, whether the calculated steam injection rate satisfies the restriction value or not is determined.

When the gas turbine is determined to be inoperable by the calculated steam injection rate, the opening of the inlet guide vanes 6, the combustion temperature, or the output target value must be corrected, though generally, the opening of the inlet guide vanes 6 or the combustion temperature is changed firstly. If the operation condition is not reduced lower than the restricted value even after the steam injection rate is reduced to the limit, there is a possibility that the output target value is inappropriate. Therefore, the gas turbine must be designed and the operation system be constructed so that no operation will be performed within such a range. The minimum value of the steam injection rate is, for example, a steam injection rate necessary at its minimum to reduce NOx.

The presetting restriction values of the steam injection rate, the combustion temperature, and the opening of the inlet guide vanes 6 are, for example, as shown in FIG. 9. FIG. 9 shows a restriction value map 45 with the air temperature indicated on the horizontal axis and the steam injection rate indicated on the vertical axis. In the restriction value map 45, restriction value lines 42a, 42b, 42c, 42d, and 42e respectively indicate restriction values of the steam injection rate in combinations a, b, c, d, and e of the inlet guide vane opening and the combustion temperature.

For example, when the combination of the inlet guide vane opening and the combustion temperature is a, the lower right region of the line 42a is an operable range 43a and the upper left region of the line 42a is an inoperable range 44a. Even when the combination of the inlet guide vane opening and the combustion temperature is b, c, d, or e, similarly, the lower right range of the line 42b, 42c, 42d, or 42e is an operable range 43b, 43c, 43d, or 43e (not shown), and the upper left range is an inoperable range 44b, 44c, 44d, or 44e.

In the compressor 1 in which as the opening of the inlet guide vanes 6 is opened, the maximum values of the vane load at all the stages of the compressor 1 reduce, as in the restriction value map 45 shown in FIG. 9, as the opening of the inlet guide vanes 6 is opened, the restriction value of the steam injection rate increases. However, in FIG. 9, the restriction value map 45 of the compressor 1 in which as the opening of the inlet guide vanes 6 is opened, the maximum values of the vane load at all the stages reduce is shown as an example, though the case that this tendency is reversed may be considered. Further, as the combustion temperature falls, the vane load reduces, so that the restriction line 42 of the steam injection rate rises.

In the restriction value map 45, for each combination of each inlet guide vane opening and the combustion temperature, one restriction value line 42 must be set, so that the operation is complicated. Therefore, in place of the restriction value map 45, a method of using a plurality of restriction value maps (not shown) with the combustion temperature fixed may be used or a restriction value map may be prepared by introducing a function $f(\theta, T)$ which is a function of an inlet guide vane opening $\theta$ and a combustion temperature T and is a function such that when the function is fixed, the vane load becomes fixed.

In the operation method of the third embodiment, compared with the second embodiment, the combustion temperature is added as an input value, so that the restriction value map is more complicated. However, by adding the combustion temperature as a parameter as in the third embodiment, the operation choices can be increased in such a way as to reduce the combustion temperature when, for example, intending to reduce the vane load even though the opening of the inlet guide vanes 6 is opened up to its limit and the output is ensured sufficiently.

Namely, so as to satisfy the restriction value of the steam injection rate using the air temperature, the inlet guide vane opening, the steam injection rate, and the combustion temperature as indexes, at least one of the temperature of air flowing into the compressor, the opening of the inlet guide vanes, the steam injection rate, and the combustion temperature is controlled, thus the operation choices can be increased, and under wide operation conditions, the reduction in the compressor reliability can be suppressed.

In the third embodiment 3, an example of controlling the steam injection rate using the opening of the inlet guide vanes 6 and the combustion temperature as input values is shown, though even in the case that the combustion temperature and the steam injection rate are used as input values to control the opening of the inlet guide vanes 6 and the case that the steam injection rate and the opening of the inlet guide vanes 6 are used as input values to control the combustion temperature, similarly, they can be controlled using the restriction value map 45 shown in FIG. 9.

Further, in this embodiment, the operation method using the restriction value map 39 in which as a preset operation restriction value map, the air temperature is indicated on the horizontal axis and the steam injection rate is indicated on the vertical axis, and for each combination of the inlet guide vane opening and the combustion temperature, the steam injection rate restriction value lines 36 are drawn is shown, though an operation method for setting the restriction value of the pressure ratio instead of the steam injection rate and monitoring the pressure ratio so as to be controlled to lower than the restriction value may be used. In this case, the pressure ratio directly relating to the vane load can be monitored, so that the reliability of the compressor is improved. Further, the restriction value of the restriction value map 45 varies with the combustion temperature and the inlet guide vane opening, though in the method of monitoring the pressure ratio, the restriction value varies only with the inlet guide vane opening regardless of the combustion temperature, so that there is an advantage that the map is simplified.

Embodiment 4

Figure 10:
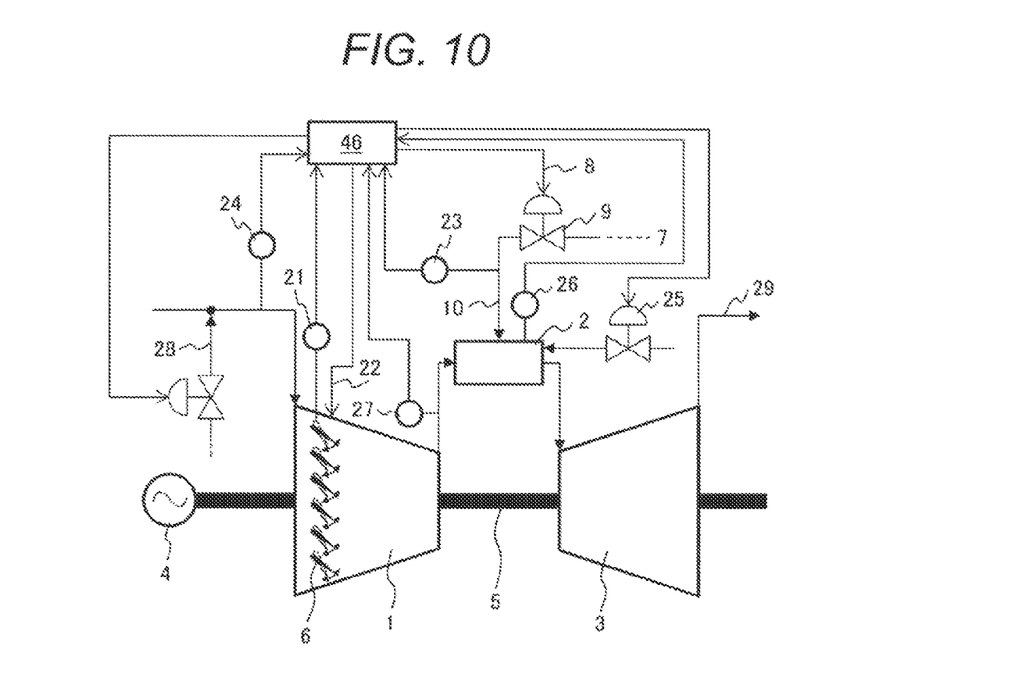
FIG. 10 is a schematic view of the gas turbine with the combustor injected with steam including the mechanism for adjusting the compressor flow-in temperature in a fourth embodiment of the present invention.

A fourth embodiment of the present invention will be explained below by referring to FIG. 10. FIG. 10 shows the gas turbine of the fourth embodiment, where a temperature control mechanism 28 for controlling the inlet temperature of the compressor 1 is added. As a control mechanism of the inlet temperature, for example, there is a mechanism for bleeding a part of discharged air of the compressor 1, mixing it with air at the inlet of the compressor 1, thereby raising the inlet temperature, and a mechanism for spraying steam near the inlet of the compressor 1 and lowering the temperature. In this case, in the restriction value map, by reading the temperature on the horizontal axis shown in FIG. 4 as a compressor inlet temperature, a similar restriction value map can be used.

In the gas turbine of the first embodiment, the atmospheric temperature cannot be changed, though in the gas turbine of this embodiment, the inlet temperature of the compressor 1 becomes a controllable parameter by the control unit 46, so that the operation freedom is improved. Therefore, the operation choices can be increased and under wide operation conditions, the reduction in the compressor reliability can be suppressed.

In this embodiment, using the gas turbine of the fourth embodiment as an embodiment, the gas turbine with the temperature control mechanism 28 at the compressor inlet added is explained, though the temperature control mechanism 28 can be added at each compressor inlet in the first, second, and third embodiments.

Embodiment 5

Figure 11:
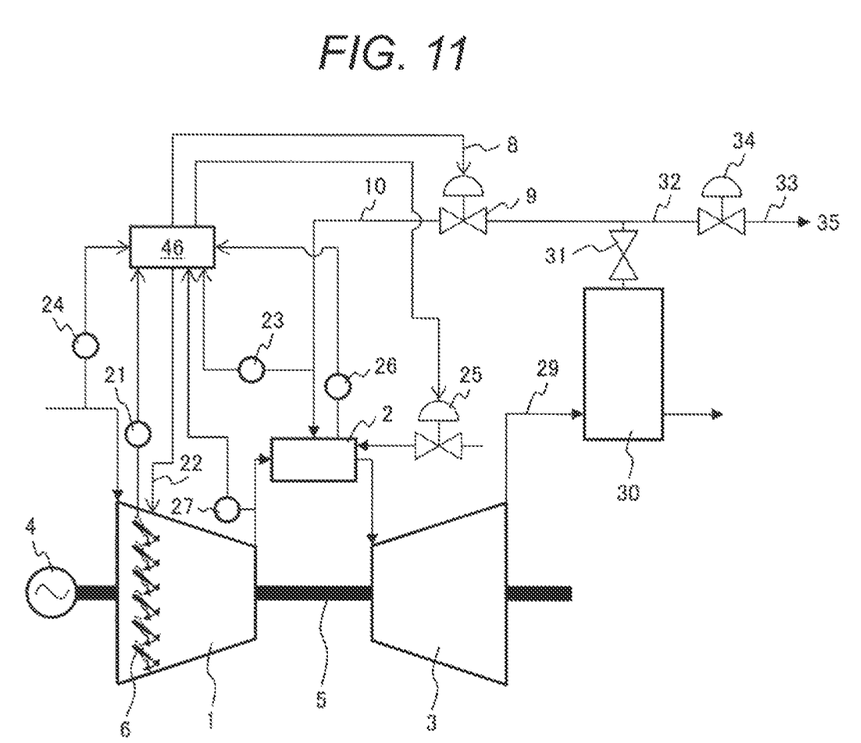
FIG. 11 is a schematic view of the gas turbine with the combustor injected with steam including the cogeneration system in a fifth embodiment of the present invention.

A fifth embodiment of the present invention will be explained below by referring to FIG. 11. The gas turbine of the fifth embodiment includes the rotor 5, the compressor 1 for compressing air, the inlet guide vanes 6 installed at the stages near the inlet of the compressor 1, the inlet guide vane opening monitoring mechanism 21 for monitoring the opening of the inlet guide vanes 6, the inlet guide vane adjustment mechanism 22 for adjusting the inlet guide vane opening, the combustor 2 for taking in compressed air, mixing it with the fuel 18, and burning them, the turbine 3 for converting the combustion energy to the drive force of the rotor 5, the generator 4 for converting the rotation drive force of the rotor 5 to electricity, the steam feed system 7 for feeding steam to the combustor 2, the pressure regulation valve 9 for adjusting the steam injection rate, the steam rate adjustment mechanism 8 for adjusting the opening of the pressure regulation valve 9, the steam monitoring mechanism 23 for monitoring the steam rate injected to the combustor 2, and the air temperature monitoring mechanism 24 for monitoring the atmospheric temperature.

Further, the gas turbine of the fifth embodiment includes an exhaust heat boiler 30 for recovering the exhaust heat of exhaust gas 29 of the gas turbine, an on-off valve 31, a process steam pipe system 33 for feeding saturated steam 32 generated by the exhaust heat boiler 30 to a device using seam via the on-off valve 31, and an pressure regulation valve 34 for adjusting the pressure of the saturated steam 32 fed to the device using seam.

The exhaust gas 29 of the turbine 3 is led to the exhaust heat boiler 30, is heat-exchanged with water in the exhaust heat boiler 30, and then is exhausted by an appropriate method. The water in the exhaust heat boiler 30 recovers heat from the exhaust gas 29 of the gas turbine 3, is adjusted to fixed pressure by the pressure regulation valve 34 as the saturated steam 32 from the exhaust heat boiler 30 via the on-off valve 31, and is fed as the process steam 35 to various steam use devices such as an air conditioner and a hot water supplier. On the other hand, a part of the saturated steam 32 is injected into the combustor 2 via the pressure regulation valve 9 through the steam introduction path 10.

Namely, this system is a cogeneration system using a part of the saturated steam 32 of the exhaust heat boiler as steam injection to the combustor 2 in the gas turbine shown in the fifth embodiment. In the cogeneration system, the saturated steam 32 is always generated and the remainder after the use thereof as the process steam 33 is injected to the combustor 2. The steam injection rate is determined by the difference between the rate of the saturated steam 32 generated by the exhaust heat boiler 30 and the steam rate used as the process steam 35, so that the steam injection rate to be input is decided, and a control method for adjusting the output by the opening of the inlet guide vanes 6 is used. When the operation condition exceeds the restriction value and the steam injection rate must be adjusted, the rate of the saturated steam 32 generated by the exhaust heat boiler 30 is reduced or the generated saturated steam 32 is not input into the combustor 2 but is discharged into the open air.

In this embodiment, the reduction of the reliability of the compressor 1 caused by the surplus steam rate that occurs when surplus steam is input into the combustor 2 can be avoided. In this embodiment, an embodiment where the cogeneration system is added to the first embodiment is shown, though it can be applied to the gas turbines of the second, third, and fourth embodiments.

Further, in the aforementioned, the control method for the gas turbine injected with steam is described, though even in a gas turbine with inert gas other than steam injected into the combustor, by reading the steam injection rate as an injection rate of the inert gas, a similar control method is enabled.

As explained in the aforementioned respective embodiments, so as to satisfy the restriction value of the steam injection rate using the temperature, inlet guide vane opening, and steam injection rate as indexes, at least one of the air temperature flowing into the compressor, the steam injection rate, and the inlet guide vane opening is controlled, thus a restriction value for preventing the vane load of the compressor or surge margin in each atmospheric temperature condition, the steam injection rate, and the inlet guide vane opening from exceeding a fixed quantity is preset, thus the inlet guide vane opening or the steam injection rate can be restricted or controlled, so that the operation conditions capable of ensuring the safety of the compressor of the gas turbine are made clear and the reliability of the compressor is improved.

The invention claimed is:

1. A gas turbine having a compressor for compressing air, a combustor for taking in compressed air discharged from the compressor, mixing it with fuel, and burning them, and a turbine driven by combustion gas generated in the combustor, comprising:
   inlet guide vanes installed at a stage near an inlet of the compressor for adjusting a compressor flow rate by changing an attaching angle thereof,
   a steam injector for injecting steam to the combustor,
   a steam adjustment valve for adjusting a steam injection rate, and a steam rate controller for adjusting an opening of the steam adjustment valve,
   a steam monitor for monitoring the steam injection rate of steam injected to the combustor, an air temperature monitor for monitoring an atmospheric temperature, and
   a unit controller for determining whether a restriction value of the steam injection rate using an air temperature, an opening of the inlet guide vanes, and the steam injection rate as indexes is satisfied, and controlling at least one of the air temperature of air flowing into the compressor, the steam injection rate, and the inlet guide vane opening,
   wherein the unit controller, using the atmospheric temperature, an output target value, and the steam injection rate as input values,
   calculates an appropriate opening of the inlet guide vanes,
   compares the calculated appropriate opening with a preset restriction value of the inlet guide vanes in a restriction value map,
   determines whether or not the calculated appropriate opening of the inlet guide vanes satisfies the preset restriction value of the inlet guide vanes, and
   when the calculated appropriate opening of the inlet guide vanes does satisfy the preset restriction value, controls the opening of the inlet guide vanes so as to become the appropriate opening calculated, and
   when the calculated appropriate opening of the inlet guide vanes does not satisfy the preset restriction value, reduces the steam injection rate.

2. An operation method of a gas turbine having a compressor for compressing air, a combustor for taking in compressed air discharged from the compressor, mixing it with fuel, and burning them, and a turbine driven by combustion gas generated in the combustor, inlet guide vanes installed at a stage near an inlet of the compressor for adjusting a compressor flow rate by changing an attaching angle thereof, and a steam injector for injecting steam to the combustor, comprising the steps of:
   using atmospheric temperature, a steam injection rate, and a target output as input values, calculating an appropriate opening of the inlet guide vanes based on the input values,
   comparing the calculated appropriate opening of the inlet guide vanes with a preset restriction value in a restriction value map,
   determining whether or not the calculated appropriate opening of the inlet guide vanes satisfies the preset restriction value of the inlet guide vanes, and
   when the calculated appropriate opening of the inlet guide vanes does satisfy the preset restriction value, controlling an inlet guide vane opening to become the calculated appropriate opening, and
   when the calculated appropriate opening of the inlet guide vanes does not satisfy the preset restriction value, reducing the steam injection rate.

* * * * *